March 31, 1959     C. H. YOHE     2,880,297
ELECTRIC HEATING UNITS
Filed June 22, 1955     2 Sheets-Sheet 1
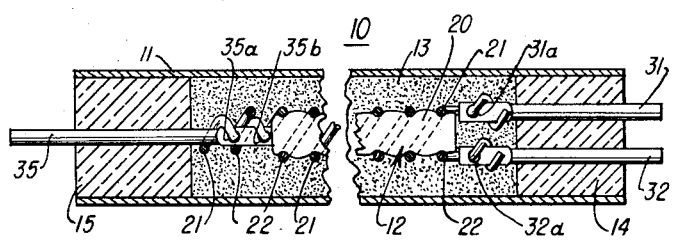
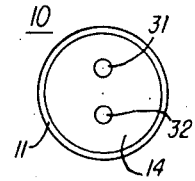
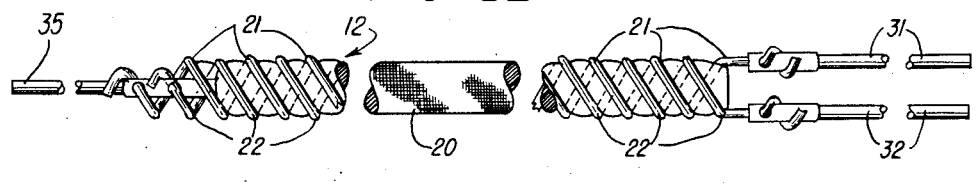
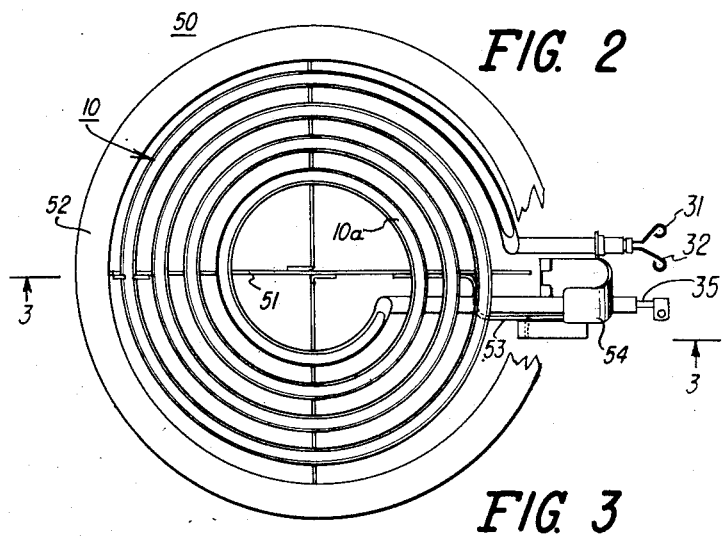
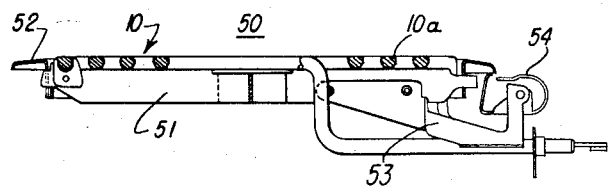
INVENTOR.
Charles H. Yohe
BY
Smith, Olsen, Baird & Miller,
Attys.

March 31, 1959  C. H. YOHE  2,880,297
ELECTRIC HEATING UNITS
Filed June 22, 1955  2 Sheets-Sheet 2

INVENTOR.
Charles H. Yohe
BY Smith, Olsen, Baird & Miller,
Attys.

United States Patent Office 2,880,297
Patented Mar. 31, 1959

2,880,297

ELECTRIC HEATING UNITS

Charles H. Yohe, Glen Ellyn, Ill., assignor to General Electric Company, a corporation of New York Application June 22, 1955, Serial No. 517,290

4 Claims. (Cl. 201—67)

The present invention relates to electric heating units, and more particularly to such units employed in the production of electric hotplates for electric ranges, or the like.

In carrying out automatic cooking operations on an electric range, it is highly desirable to employ an electric hotplate that comprises an electric heating unit incorporating an arrangement of the electric heating elements therein that permits of considerable selectivity in the energization thereof so as to obtain the corresponding selectivity in the production of heat at the required rates, while maintaining small the total mass of the heating unit, so as to avoid the temperature-time lag inherent in a heating unit of large mass.

Accordingly, it is a general object of the invention to provide an electric hotplate incorporating an electric heating unit of the sheathed resistance conductor type and of the specification noted.

Another object of the invention is to provide an electric heating unit embodying an improved arrangement of the elements thereof so as to achieve great selectivity in the production of heat at the required rates, while preserving compactness of the structure thereof.

Another object of the invention is to provide an electric heating unit of the character described, that incorporates an improved arrangement of a number of heating elements in the sheath that may be selectively energized, while maintaining small the diameter of the sheath, so as to avoid the temperature-time lag inherent in a heating unit provided with a sheath of large diameter.

A further object of the invention is to provide an electric heating unit of the type described, and involving an improved arrangement of a heater assembly incorporated in the enclosing sheath thereof, wherein the construction of the heater assembly may be selectively varied to effect the production of a corresponding wide variety of finished heating units, and without any substantial variation of the remaining components of the heating units or in the steps of making the same, whereby great manufacturing simplicity and economy are achieved.

A further object of the invention is to provide an electric heating unit of the character described, that incorporates a supporting core or mandrel carrying one or more electric resistance conductors of helical form, wherein the core is formed of filaments of electrical-insulating material.

A still further object of the invention is to provide a heater assembly for an electric heating unit of the character described, wherein the material of the core mentioned consists essentially of silica, also containing nonsiliceous metal oxides, the ratio of the silica to the metal oxides being in excess of 9, and having a melting point in excess of 1950° F.

Further features of the invention pertain to the particular arrangement of the elements of the electric heating unit, whereby the above-outlined and additional operating features thereof are attained.

The invention, both as to its organization and method of operation, together with further objects and advantages thereof, will best be understood by reference to the following specification, taken in connection with the accompanying drawings, in which:

Figure 1 is a fragmentary longitudinal sectional view of the opposite end portions of an electric heating unit embodying the present invention;

Fig. 1A is an end view of the individual terminal end of the heating unit of Fig. 1;

Fig. 1B is a fragmentary longitudinal side view of a heater assembly that is incorporated in the heating unit of Fig. 1;

Fig. 2 is a plan view of an electric hotplate incorporating the electric heating unit shown in Fig. 1;

Fig. 3 is a vertical sectional view of the hotplate, taken in the direction of the arrows along the line 3—3 in Fig. 2;

Figure 4:
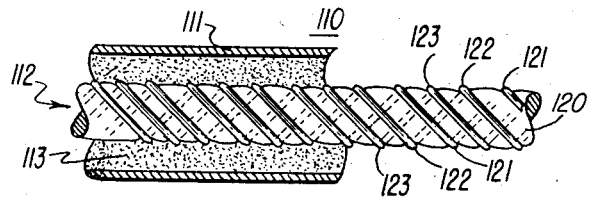
Fig. 4 is a fragmentary longitudinal sectional view of the central portion of a modified form of the electric heating unit.

Referring now to Figs. 1, 1A and 1B of the drawings, the electric heating unit 10 there illustrated, and embodying the features of the present invention, is of the sheathed resistance conductor type, and is especially designed for use in the production of an electric hotplate of the character employed in an electric range, or the like, as shown in Figs. 2 and 3. Specifically, the heating unit 10 comprises an elongated tubular metallic sheath 11 enclosing an elongated compressible heater assembly 12, as well as an elongated tubular dense layer 13 of electrical-insulating and heat-conducting material, the layer 13 embedding the heater assembly 12 and retaining the same in a highly compressed state and maintaining the same in spaced relation with respect to the sheath 11. In the arrangement, the sheath 11 may be formed of a nickel-chrome-iron alloy, one such alloy comprising approximately 14% chromium, 6% iron and the remainder chiefly nickel; while the layer 13 preferably comprises a highly compacted granular material consisting essentially of a refractory metal oxide, such, for example, as magnesium oxide.

As best shown in Fig. 1B, the heater assembly 12 comprises an elongated core 20 formed of filaments of electrical-insulating material, and two elongated heating elements 21 and 22 formed of resistance wire and tightly wound upon and supported by the core 20. More particularly, the resistance conductors 21 and 22 are interwound in plural filar (bifilar) relation, so that between each two adjacent turns of either one of the resistance conductors is disposed a turn of the other of the resistance conductors, the filaments of the core 20 possessing sufficient resiliency that they are substantially compressed below the turns of the resistance conductors 21 and 22 and protrude somewhat into the spaces between adjacent convolutions of the resistance conductors 21 and 22 in order to maintain the fixed spacings thereof.

The fibers of the core 20 are of siliceous material and essentially comprise glass fibers from which a preponderance of the glass-forming metal oxide constituents have been leached; and the product "Refrasil" manufactured by the H. I. Thompson Company is quite satisfactory. This product is formed by leaching type E glass fibers with a mineral acid (preferably HCl or $HNO_3$) for several hours at an elevated temperature, which product has a softening point of about 2350° F., and a melting point somewhat in excess of 3000° F.; and a typical composition of this product is as follows:

|  | Percent |
|---|---|
| Silica ($SiO_2$) | 95.68 |
| Aluminum oxide ($Al_2O_3$) | 1.43 |
| Titanium oxide ($TiO_2$) | 0.08 |
| Iron oxide ($Fe_2O_3$) | 0.09 |
| Calcium oxide (CaO) | Nil |
| Magnesium oxide (MgO) | 0.08 |
| Alkali as sodium oxide ($Na_2O$) | 0.32 |
| Boric anhydride ($B_2O_3$) | Nil |
|  | 97.68 |

The 2.32%, unaccounted for, includes some water of hydration, some water of absorption, some uncombusted carbonaceous residue, some undetermined impurities present in the original glass mix, and minor analytical errors.

A suitable type E glass fiber that may be leached is the product "ECC-11 Fiberglas" manufactured by the Owens-Corning Fiberglas Corporation. This product formed of type E glass has a softening point of about 1100° F. and a melting point of about 1400° F.; and a typical composition of this product is as follows:

|  | Percent |
|---|---|
| Silica ($SiO_2$) | 53.76 |
| Aluminum oxide ($Al_2O_3$) | 15.29 |
| Titanium oxide ($TiO_2$) | 0.08 |
| Iron oxide ($Fe_2O_3$) | 0.23 |
| Calcium oxide (CaO) | 16.80 |
| Magnesium oxide (MgO) | 5.10 |
| Alkali as sodium oxide ($Na_2O$) | 0.42 |
| Boric anhydride ($B_2O_3$) | 6.60 |
|  | 98.28 |

The 1.72%, unaccounted for, includes some uncombusted carbonaceous residue, some undetermined impurities present in the original glass mix, and minor analytical errors.

More particularly, the leached glass product specified may be produced from the original glass product specified by leaching the original product with HCl of about 11.2% initial concentration at a temperature of about 140° F., for about five hours. Thereafter, the acid-leached product is washed acid-free, air-dried, and then fired at about 1700° F., for about eight hours. It will be appreciated that in the leaching step a preponderance of the glass-forming metal-oxide constituents are extracted, so that in the final product the ratio of the silica to the small remaining glass-forming metal oxide constituents is substantially greater than 9; whereby the final product is substantially pure silica. The details of the method generally described above for leaching the original product specified in order to produce the final product specified are disclosed in U. S. Patent No. 2,491,761, granted on December 20, 1949 to Leon Parker and Alexander Cole.

Alternatively, the siliceous filaments of the resilient layer 20 may comprise the product "Fiberfrax" manufactured by the Carborundum Company, or the product "RF800" manufactured by the Johns-Manville Company; however, the "Refrasil" product initially specified is exceedingly satisfactory, as it comprises substantially 96% pure silica and possesses the exceedingly high softening and melting points previously noted.

Further, the heating unit 10 comprises two electrical terminals 31 and 32 respectively connected to the adjacent ends of the resistance conductors 21 and 22 and projecting longitudinally from the corresponding end of the sheath 11, as well as an electrical terminal 35 commonly connected to the other ends of the resistance conductors 21 and 22 and projecting from the corresponding end of the sheath 11. As illustrated in Figs. 1 and 1A, the electrical terminals 31 and 32 are arranged in spaced-apart relation with respect to each other and to the adjacent right-hand end of the sheath 11 and are embedded in an associated electrical-insulating plug 14, closing the associated right-hand end of the metallic sheath 11; and the electrical terminal 35 is arranged in spaced-apart relation with respect to the adjacent left-hand end of the sheath 11 and embedded in an associated electrical-insulating plug 15 closing the associated left-hand end of the metallic sheath 11. The ends of the resistance conductors 21 and 22 may be respectively connected to the adjacent ends of the electrical terminals 31 and 32 in any suitable manner, including welding, if desired, but one arrangement involves the mere threading of the ends of the resistance conductors 21 and 22 respectively through corresponding holes or eyes 31a and 32a respectively provided in the adjacent ends of the electrical terminals 31 and 32, together with some frictional wrapping of the free ends of the resistance conductors 21 and 22 respectively about the adjacent shanks of the respective electrical terminals 31 and 32. Similarly, the ends of the resistance conductors 21 and 22 may be respectively connected to the adjacent ends of the electrical terminal 35 in any suitable manner, including welding, if desired, but one arrangement involves the mere threading of the ends of the resistance conductors 21 and 22 respectively through two spaced-apart holes or eyes 35a and 35b provided in the adjacent end of the electrical terminal 35, together with some frictional wrapping of the free ends of the resistance conductors 21 and 22 about the adjacent shank of the electrical terminal 35.

In the arrangement, the resistance conductors 21 and 22 may be formed of a suitable nickel-chromium alloy, such, for example, as the alloy comprising 80% nickel and 20% chromium; the plugs 14 and 15 may be formed of a compressed mass of refractory metal oxide, such, for example, as magnesium oxide; while the electrical terminals 31, 32 and 35 may be formed of a basic steel stock provided with a thin nickel coating, if desired.

In view of the foregoing, it will be appreciated that in the heating unit 10, the resistance conductors 21 and 22 are mutually electrically insulated from each other and from the sheath 11 and are respectively connected between the individual electrical terminal 31 and the common electrical terminal 35 and between the individual electrical terminal 32 and the common electrical terminal 35.

As an illustrative embodiment of the heating unit 10, the sheath 11 may have a diameter of about 0.270"; the resistance conductor 21 may comprise a suitable length of #30 gauge resistance wire having a total resistance between the electrical terminals 31 and 35 of about 74 ohms; the resistance conductor 22 may comprise a suitable length of #31 gauge resistance wire having a total resistance between the electrical terminals 32 and 35 of about 111 ohms; and the total number of turns of resistance wire per inch of the core 20 may be in the general range 22 to 28 in order to provide suitable spacings therebetween. The heating unit 10 of the specification set forth is capable of developing a wide range of heating rates, when it is selectively energized from a 3- wire Edison source of alternating current supply of 236 volts, single-phase, as indicated in the following table:

*Table*

| No. | Connection | Wattage |
|---|---|---|
| 1 | 21—open | 0 |
|   | 22—open | 0 |
| 2 | 21—open | 0 |
|   | 22—118 v | 125 |
| 3 | 21—open | 0 |
|   | 22—236 v | 500 |
| 4 | 21—118 v | 188 |
|   | 22—open | 0 |
| 5 | 21—118 v | 188 |
|   | 22—118 v | 125 |
| 6 | 21—118 v | 188 |
|   | 22—236 v | 500 |
| 7 | 21—236 v | 750 |
|   | 22—open | 0 |
| 8 | 21—236 v | 750 |
|   | 22—118 v | 125 |
| 9 | 21—236 v | 750 |
|   | 22—236 v | 500 |
| 10 | 21 and 22 in series—118 v. | 75 |
| 11 | 21 and 22 in series—236 v. | 301 |

When the electric heating unit 10 is developing its full rated wattage of 1250 watts, the sheath 11 might have a temperature of about 1550° F. and the heating elements 21 and 22 might have a temperature of about 1750° F.; whereby the temperature of the core 20 might be in the vicinity of 1750° F. However, this temperature is well below the softening temperature (2350° F.) of the siliceous material of the core 20; whereby the core 20 remains in the solid state and in its highly compressed condition, as previously explained.

Considering now the method of making the electric heating unit 10, the heater assembly 12 of Fig. 1B is first produced by tightly wrapping suitable lengths of the heating elements 21 and 22 in bifilar relation around and along a suitable length of the core 20, the heating elements 21 and 22 being wrapped simultaneously employing the resilient core 20 as a mandrel or arbor, so as to provide the elongated helical arrangement with the heating elements 21 and 22 in spaced-apart relation. The ends of the heating elements 21 and 22 are then secured to the proper ones of the inner ends of the electrical terminals 31, 32 and 35, employing the proper eyes or holes 31a, 32a, 35a and 35b formed therein, and then frictionally wound about the adjacent inner ends of the electrical terminals 31, 32 and 35, thereby producing the finished heater assembly 12. At this time, the ends of the heating elements 21 and 22 may be further secured to the adjacent ends of the electrical terminals 31, 32 and 35 by welding, if desired, although this is not ordinarily necessary. Specifically, the welding step, if employed, may be carried out in the manner disclosed in U.S. Patent No. 2,546,315, granted on March 27, 1951 to Sterling A. Oakley.

The heater assembly 12 is then arranged within a suitable length of the tubular sheath 11, and one end of the sheath 11 is closed by a cooperating metal plug or fixture, not shown, that also secures the associated electrical terminal or terminals in place. For example, the metal plug mentioned may be arranged in the end of the sheath 11 from which the electrical terminals 31 and 32 project; whereby the plug mentioned retains the terminals 31 and 32 in spaced-apart relation mutually with respect to each other and with respect to the adjacent end of the sheath 11. This assembly is then transferred to a combined loading and tamping machine of the general character of that disclosed in U.S. Patent No. 2,316,659, granted on April 13, 1943 to John L. Andrews, wherein the assembly is retained in an upright position with the metal plug mentioned at the bottom of the assembly, and the granular material 13 is charged into the open top end of the sheath 11 and tamped in place. The combined machine of the Andrews patent progressively charges the material 13 into the top of the sheath 11 about the heater assembly 12 in a substantially central position with respect to the sheath 11 and tamps the material 13 in place into a firm annular layer disposed between the sheath 11 and the heater assembly 12, and embedding the heater assembly 12 and compressing the same to a limited extent. After the sheath 11 has been completely filled with the material 13, the assembly is removed from the combined machine mentioned, and the upper end of the sheath is closed by a metal plug, not shown; whereby the assembly is ready for final compression of the heater assembly 12 and the material 13.

Preferably, these operations are carried out in a rolling machine of the general character of that disclosed in U.S. Patent No. 2,677,712, granted on May 4, 1954 to Sterling A. Oakley. More particularly, the assembly is subjected to a plurality of successive gradual cold rolling passes employing a corresponding plurality of oval rolling stages arranged in vertical alignment and alternately angularly rotated through an angle of approximately ninety degrees to prevent finning of the sheath 11. In passing it is noted that the last-mentioned Oakley patent also disclosed the arrangement of the previously mentioned metal plugs in the opposite ends of the sheath 11 to prevent loss of the material 13 and displacement of the electrical terminals 31, 32 and 35 during the carrying out of this cold working step. Specifically in this step the diameter of the sheath 11 is substantially reduced (normally about 10%) so as to effect substantial compression of the heater assembly 12 and the material 13, and reduction of the granular form of the material 13 into a hard, dense, rock-like mass. For example, a sheath 11 having an initial outside diameter of 0.312" is normally cold worked, in the manner described, so that it has a final diameter of 0.270", with a corresponding reduction of the diameter of the heater assembly 12.

Thereafter, the metal plugs mentioned are removed from the opposite ends of the sheath 11, and the insulating plugs 14 and 15 are secured in place to produce the finished electric heating unit 10, as shown in Figs. 1, 1A and 1B.

The above described method is particularly well suited to the manufacture of heating units of the sheathed type that are of small mass and comprise sheaths of very small diameter. For example, employing the present method, it is entirely feasible to manufacture such a heating unit having a sheath of only 0.125" outside diameter, even though it comprises a plurality of helical heating elements. In this embodiment, the wall of the sheath has a thickness of about 0.010"; the heater assembly has a diameter of about 0.035"; and the spacing between the sheath and the heater assembly is about 0.035". This heating unit has a very small mass and an exceedingly fast response to energization and deenergization, since the mass thereof is greatly minimized.

Referring now to Figs. 2 and 3, the electric hotplate 50 there illustrated is a 6" unit of 1250 watts and incorporates the electric heating unit 10, shown in Figs. 1, 1A and 1B, and provided with a sheath having an outside diameter of 0.270", the heating unit 10 being wound in spiral form and then flattened to provide the substantially planar surface or platform 10a adapted removably to support a cooking vessel, or the like. Further, the hotplate 50 comprises a spider 51 supporting the heating unit 10 and carrying a surrounding trim ring 52, together with hinge mechanism including two pivotally connected hinge elements 53 and 54. The hinge element 53 is rigidly connected to the spider 51, while the hinge element 54 is adapted to be connected to the cooking top of an electric range, or the like, so as to mount the hotplate 50 for hinged movements into and out of an associated opening provided in the cooking top and between corresponding working and cleaning positions.

The incorporation of the heating unit 10 in the hotplate 50, particularly when the latter is employed in an electric range that is provided with automatic cooking control facility, is very advantageous as the heating unit 10 is capable of developing a wide range of heating rates, as previously explained, while preserving the great advantage of quick response to energization and deenergization, due to the small mass thereof. This feature is very important as it avoids the temperature-time lag inherent in conventional heating units of the plural heating element type that are of large mass. As a practical matter, these important structural features of the heating unit 10 are rendered feasible from the standpoint of manufacture by the present method, since heretofore there has not been known any method by which such a heating unit employing a plurality of helical heating elements involving such close spacings might be made; whereby large sheaths have been necessary in such conventional heating units to accommodate the required spacing of the helical heating elements. Fundamentally, the present method substantially completely removes the possibility of short-circuiting of the helical heating elements during the compressing or compacting step of the manufacturing operation, since the required spacings of the turns of the helical resistance elements or conductors are positively established in the previously produced heater assembly.

Figure 4A:
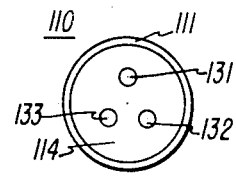
Fig. 4A is an end view of the individual terminal end of the heating unit of Fig. 4.

Referring now to Figs. 4 and 4A, the modified form of the electric heating unit 110 there illustrated is quite similar to the electric heating unit 10 of Figs. 1, 1A and 1B, except that it comprises three heating elements 121, 122 and 123 wound in trifilar relation upon the core 120. Thus, three individual electrical terminals 131, 132 and 133 are required at one end of the sheath 111 to terminate the adjacent ends of the respective heating elements 121, 122 and 123; and a common electrical terminal, not shown, at the other end of the sheath 111 commonly terminates the adjacent ends of the heating elements 121, 122 and 123. Of course the heating unit 110 has an even wider range of heating rates than the heating unit 10, because of the inclusion of the additional heating element 123.

The general modes of making the heater assembly 112 and the finished heating unit 110 are the same as described in making the corresponding assembly 12 and finished heating unit 10, and are not reiterated in the interest of brevity.

Figure 5:
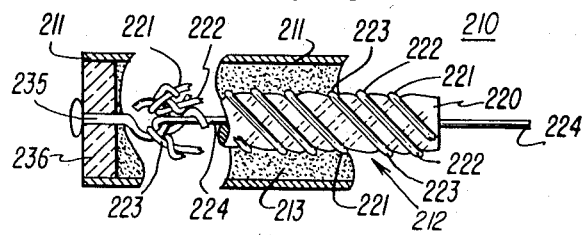
Fig. 5 is a fragmentary longitudinal sectional view of an end portion of another modified form of the electric heating unit.
Figure 5A:
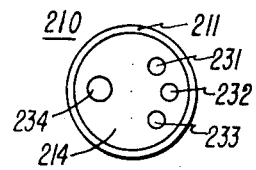
Fig. 5A is an end view of the terminal end of the heating unit of Fig. 5.

Referring now to Figs. 5 and 5A, the modified form of the electric heating unit 210 there illustrated is quite similar to the electric heating unit 110 of Figs. 4 and 4A, except that it further comprises a centrally disposed lead or return conductor 224, in addition to the three heating elements 221, 222 and 223 wound in trifilar relation upon the core 220. Thus, in the heating unit 210, the layer 220 of resilient insulating filaments is of sleeve-like form, embedding the lead conductor 224 and carrying the helical heating elements 221, 222 and 223, so as to maintain the mutual spacing of all of the parts 221, 222, 223 and 224 in the heater assembly 212. Moreover, four electrical terminals 231, 232, 233 and 234 are provided at one end of the sheath 211 and respectively terminating the conductors 221, 222, 223 and 224; and, if desired, the lead conductor 224 may be formed of a sufficiently heavy gauge wire that the electrical terminal 234 merely comprises the outer end thereof projecting from the adjacent end of the sheath 211. An eye-bolt 235 is arranged in the other end of the sheath 211 and commonly terminates the conductors 221, 222, 223 and 224, the bolt 235 being supported by a plug 236 carried in the adjacent end of the sheath 211; which plug 236 may be formed of insulating material, as illustrated, or of conducting material, so as positively to ground the sheath, if desired.

The electric heating unit 210 offers at least the flexibility of selective energization as the heating unit 110; and in addition thereto, lends itself to energization from a 3-phase alternating current supply source, employing the central lead conductor 224 as the center of a star connection.

In making the heater assembly 212, the layer of insulating filaments 220 must be first applied to the lead conductor 224; and this may be accomplished by braiding, knitting, wrapping, etc.; and then the heating elements 221, 222 and 223 are wound in trifilar relation upon the composite core 220 to produce the heater assembly 212. The subsequent steps in producing the finished heating unit 210 are substantially identical to those involved in finishing the heating unit 10, and are not reiterated in the interest of brevity.

Figure 6:
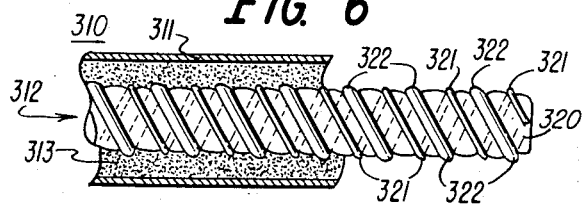
Fig. 6 is a fragmentary longitudinal sectional view of the central portion of a further modified form of the electric heating unit.
Figure 6A:
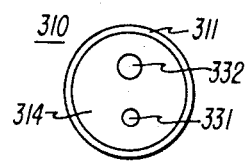
Fig. 6A is an end view of the individual terminal end of the heating unit of Fig. 6.

Referring now to Figs. 6 and 6A, the modified form of the electric heating unit 310 there illustrated is substantially identical to the electric heating unit 10 of Figs. 1, 1A and 1B, except that the two heating elements 321 and 322 are of substantially different wattage ratings, since the resistance wires from which the heating elements 321 and 322 are formed are respectively fine and coarse. Thus, the heating unit 310 is especially useful where the heating rates desired swing between two extreme values, such for example as 50 and 1250 watts. In this case, the heating elements 321 and 322 may have respective ratings of 50 and 1200 watts; whereby the element 322 constitutes a primary heating element and the element 321 constitutes a secondary (or warming) heating element.

The general modes of making the heater assembly 312 and the finished heating unit 310 are altogether similar to those described in making the corresponding heater assembly 12 and finished heater 10, and are not reiterated in the interest of brevity.

Figure 7:
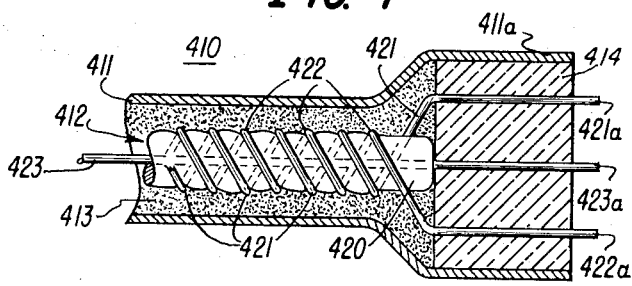
Fig. 7 is a fragmentary longitudinal sectional view of an end portion of still another modified form of the electric heating unit.
Figure 7A:
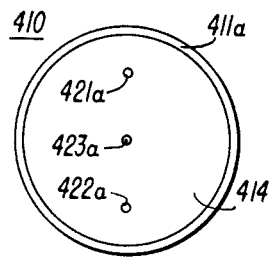
Fig. 7A is an end view of the terminal end of the heating unit of Fig. 7.

Referring now to Figs. 7 and 7A, the modified form of the electric heating unit 410 there illustrated is quite similar to the electric heating unit 210 of Figs. 5 and 5A, except that separate electrical terminals are altogether eliminated by the mere utilization of the ends 421a, 422a and 423a of the respective heating elements 421 and 422 and lead conductor 423 for this purpose. Also, in the heating unit 410 it is contemplated that the opposite ends of the sheath 411 are provided with enlarged end-bells 411a to accommodate the desired spacing of the conductive ends or terminals 421a, 422a and 423a, and the reception of the associated locating insulating plugs 414. Moreover, in the heating unit 410 it is contemplated that the opposite ends thereof are identical; whereby any junctions required are provided by exterior wiring or connections.

In making the heating unit 410 the manufacture of the heater assembly 412 is substantially the same as that of the heater assembly 12; however, the finishing of the heating unit 410 is somewhat different from that involved in finishing the heating unit 10, because of the provision of the end-bells 411a at the opposite ends of the sheath 411. This structure may be obtained in a number of ways. For example, in the rolling step, the travel of the sheath 411 may be restricted so that only the intermediate portion thereof moves through the cooperating rolling passes; whereby the formation of the enlarged end-bells 411a merely follows from the reduction of the intermediate portion of the sheath 411, the end-bells 411a being of the initial diameter of the sheath. On the other hand, the opposite ends of the sheath 411 may be actually expanded following the rolling step employing a suitable tapered mandrel. As a matter of fact, a combination of these steps is recommended; whereby the intermediate portion of the sheath 411 is of smaller diameter than the initial diameter of the tubular stock from which it was formed, and the end-bells 411a are of larger diameter than the initial diameter of the tubular stock mentioned. Finally, the plugs 414 are pressed into the end-bells 411a to effect the desired compression of the granular material 413 in the transition sections of the sheath 411 joining the end-bells 411a.

In view of the foregoing description of the heating units 10, 110, 210, 310 and 410, it will be understood that any reasonable number of individual electric heating elements may be carried in multifilar relation upon the associated resilient insulating core, either with or without a centrally disposed lead conductor, and that this wide variation in the construction of the heater assembly imposes only small modification of the required manufacturing steps. Moreover, the further processing of the assembly in the combined loading and tamping machine and subsequently in the rolling machine is substantially independent of the character and construction of the heater assembly; whereby the number of manufacturing steps required are greatly minimized, notwithstanding the production of a great variety of individual heating units. This economy in manufacture is exceedingly important and represents a tremendous advancement in the art, as it renders it feasible to manufacture a wide variety of heating units to the exact specifications of design engineers, thereby removing an artificial limitation that has been heretofore imposed upon them with reference to availability of sizes and ratings of such heating units. In other words, heretofore it has been impractical to manufacture a few thousand heating units of an odd or peculiar rating that might be required by the new design of an article of manufacture that is sold only in such volume; whereby the design engineer has been compelled to the specification of a heating unit that is manufactured in large volume for another purpose, which heating unit is not ideal for use in the new design of the article mentioned. The present method removes these limitations, since it is capable of great flexibility, without corresponding tool costs; whereby the design of many articles of manufacture will greatly benefit therefrom.

The forms of the electric heating unit respectively shown in Figs. 5, 5A and 7, 7A, involving the lead conductors, and the method of making the same, are disclosed and claimed in the copending divisional application of Charles H. Yohe, Serial No. 739,379, filed June 2, 1958.

In view of the foregoing it is apparent that there has been provided an electric heating unit of improved and simplified construction and arrangement, which possesses great flexibility as to sizes, ratings, etc., and that is most advantageous for incorporation into a wide variety of electric hotplates for use in electric ranges, or the like.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An electric heating unit comprising an elongated compressible heater assembly, an elongated tubular metallic sheath enclosing said heater assembly, and an elongated tubular dense layer of electrical-insulating and heat-conducting material consisting essentially of magnesium oxide and arranged in said sheath and embedding said heater assembly and retaining the same in a highly compressed state and maintaining the same in spaced relation with respect to said sheath; said heater assembly comprising an elongated core in the form of a bundle of filaments of electrical-insulating material consisting essentially of silica, also containing small quantities of non-siliceous glass-forming metal oxides, chiefly aluminum oxide, said last-mentioned material being further characterized by a ratio of the silica to the metal oxides in excess of 9 and by a melting point in excess of 1950° F., and an elongated helical resistance conductor wound upon and supported by said core.

2. An electric heating unit comprising an elongated compressible heater assembly, an elongated tubular metallic sheath enclosing said heater assembly, and an elongated tubular dense layer of electrical-insulating and heat-conducting material consisting essentially of magnesium oxide and arranged in said sheath and embedding said heater assembly and retaining the same in a highly compressed state and maintaining the same in spaced relation with respect to said sheath; said heater assembly comprising an elongated core in the form of a bundle of filaments of electrical-insulating material consisting essentially of silica, also containing small quantities of non-siliceous glass-forming metal oxides, chiefly aluminum oxide, said last-mentioned material being further characterized by a ratio of the silica to the metal oxides in excess of 9 and by a melting point in excess of 1950° F., a plurality of elongated helical resistance conductors wound upon and supported by said core, said resistance conductors being interwound in plural-filar relation so that between each two adjacent turns of any one of said resistance conductors there is disposed a turn of each other of said resistance conductors.

3. The electric heating unit set forth in claim 2, and further comprising a first electrical terminal commonly connected to one end of each of said resistance conductors and projecting from the corresponding one end of said sheath, and a plurality of second electrical terminals respectively connected to the other ends of said resistance conductors and projecting from the corresponding other end of said sheath.

4. The electric heating unit set forth in claim 2, wherein each of said resistance conductors consists essentially of a length of resistance wire, and wherein the gauge of the resistance wire of at least one of said resistance conductors is substantially different from that of the resistance wire of another of said resistance conductors.

References Cited in the file of this patent

UNITED STATES PATENTS

| | | |
|---|---|---|
| 845,413 | Haagn | Feb. 26, 1907 |
| 1,359,400 | Lightfoot | Nov. 16, 1920 |
| 2,180,580 | Clark | Nov. 21, 1939 |
| 2,199,879 | Deroche | May 7, 1940 |
| 2,535,808 | Mucher II | Dec. 26, 1950 |
| 2,538,977 | Mucher | Jan. 23, 1951 |